(12) United States Patent
Payn

(10) Patent No.: X680
(45) Date of Patent: Mar. 31, 1806

(54) SPLITTINGSKINS,MACHINE SPLITTING SKINS

(76) Inventor: Stephen Payn

Stephen Payne,
Letters Patent
Issued March 31st 1806.

The Schedule referred to in these Letters Patent & making part of the same, containing a Description in the words of the said Stephen Payne himself of his Machine for splitting Skins or Neats Leather This machine consists of three principal parts viz
1st. Of a Frame, of a triangular Form firmly fixed to the Floor of the Room: this Frame supports a roller, at one end of which is attached a saw or spur wheel, which is moved or operated upon by means of a lever or handle at the back of the Machine: to the one end of this machine is suspended a Tooth, which catches in the Teeth of the wheel turning it and drawing the Leather attached to the Roller tight & downward..

Above the Roller is a Beam or plate with an opening correspondg. to the Segment of the Circle formed by the Sweep: through this opening the skin is drawn downward, by the Lever, with the hand, as the sweep cuts it with the other hand of the operator.

2nd The Press, which has a Curve corresponding to the opening in the Plate is brought down by Screws and Buttons on the skin to keep it [illegible] while cutting..

3rd The Sweep is a heavy Beam, but tapering considerably at one end which is fixed on a Pin in an upright post on which it turns: this end has several Holes, in any of which the Pin may be admitted & thus [illegible] guaged, according to the thickness of the leather, at the other end of the Beam is fixed a Hook, operating in the form of a Kirkhinders plane which splits the leather.

Witnesses
Nath.l Hunt
Ranja Read.

Stephen Sayre.

{Patent Head provided in Claims of Rejected Patent Heads.}

L.J.
M.T.C.

Stephen [illegible],
Letters Patent
Issued March 31st 1806.

The Schedule referred to in these Letters Patent & making part of the same containing a Description in the words of the said Stephen [illegible] him-self of his Machine for splitting Skins or [illegible]

This machine consists of three principal parts viz
1st. Of a Frame of a triangular Form firmly fixed to the Floor of the Room: this Frame supports a roller, at one end of which is attached a saw or [illegible] wheel, which is moved or operated upon by means of a lever or handle at the base of the Machine: To the one end of this machine is [illegible] a Tooth, which catches in the Teeth of the wheel turning it and drawing the leather attached to the roller tight & downward.-

Above the Roller is a Beam or plate with an opening correspondg to the segment of the circle formed by the Knife: through this opening the skin is drawn downward, by the lever with the hand, as the knife cuts it with the other hand of the operator.-

2nd The Press which has a [illegible] correspond-ing to the opening in the Plate is brought down by screws and Buttons on the skin to keep it smooth while cutting.-

3rd The Knife is a heavy Beam, but tapering considerably at one end which is fixed on a Pin in an upright post on which it turns: this end has several Holes, in any of which the Pin may be admitted & thus raised & guaged.

United States Patent

Patent No.: X680

According to the Patent the Leather, at the [illegible] end of the Beam is fixed a [illegible] [illegible] the Frame of the Patent Head which [illegible] the Leather.

Witnesses:
Mark E. Hunt
Lizzie Read.

Stephen Tyler.

{ Patent Head patented the Prima of Rational Patent Head. }

H.J.
M.E.B.

DRAFTSMAN'S DIVISION.

*All communications should be addressed to*
"The Commissioner of Patents.
Washington, D. C."

2—328 *a.*

*DEPARTMENT OF THE INTERIOR,*

United States Patent Office,

*Washington, D. C.,* ........ 189....

*SIR:*

*The printed* .... Copies .... *of Patent No.* Stephen Payn. are ........ *exhausted.* Mar. 31, 1806

*As soon as printed a copy will be mailed you to complete your order.*

*By direction of the Commissioner:*

*Very respectfully,*

*Chief Clerk.*

814366-97-5m